May 13, 1952     P. J. GLOSIER     2,596,236

ELECTRIC OUTLET BOX

Filed Feb. 7, 1949

*INVENTOR.*
PAUL J. GLOSIER
BY
ATTORNEY

Patented May 13, 1952

2,596,236

UNITED STATES PATENT OFFICE 2,596,236

ELECTRIC OUTLET BOX

Paul J. Glosier, Maplewood, Mo.

Application February 7, 1949, Serial No. 74,990

1 Claim. (Cl. 220—3.8)

This invention relates to improvements in outlet boxes for electric conduits, and consists chiefly in novel means for retaining the cover on such boxes.

Boxes of this type are often formed with one open face, to which is attached a cover plate. The cover plate is formed to receive a central threaded hollow cylindrical projection for the attachment of a fixture and has two openings adjacent its periphery substantially diametrically opposite each other. One of these openings is elongated outwardly, so that its outer end is open. The other opening is elongated parallel to the edge of the cover plate, one of its end portions being sufficiently large to permit the passage of a screwhead therethrough. At corresponding positions inwardly extending tabs, formed with openings to receive screws, are formed on the box adjacent its open face. The cover is secured to the box by screws which extend through the diametrically opposite openings in the cover and into the tabs. In boxes of this type it has been found that if the screws become even slightly loosened and the cover plate is turned slightly due to vibration, or by the attachment of a fixture, the cover plate and fixture attached to it may fall, due to the registry of one of the screw heads with the enlarged portion of the opening in the cover. A short circuit or a ground may result, with fire as a possible consequence.

An object of this invention is to provide means whereby the undesired turning of the cover plate, and the consequent registry of the screw head with the enlarged opening may be prevented.

Other objects and advantages of this invention will appear in the disclosure when read in connection with the accompanying drawings, in which.

Figure 1:
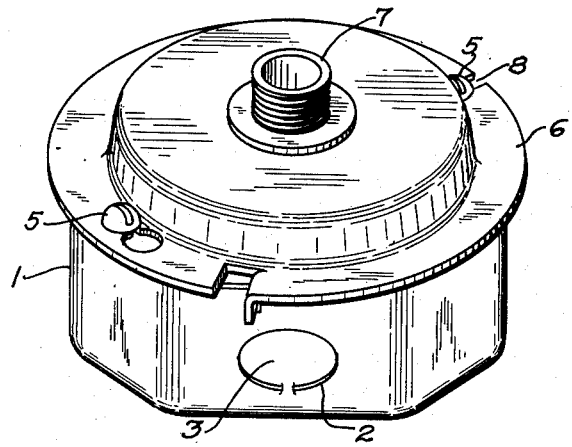
Fig. 1 is a three dimensional view of an outlet box made in accordance with my invention.
Figure 2:
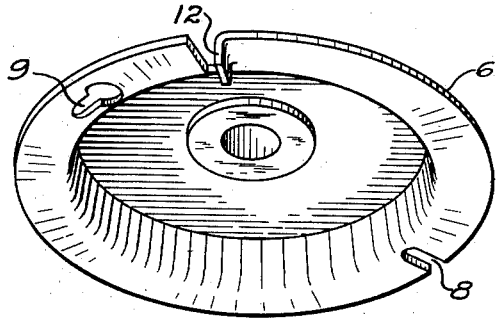
Fig. 2 is a three dimensional view of the outlet box with the cover plate removed.
Figure 2:
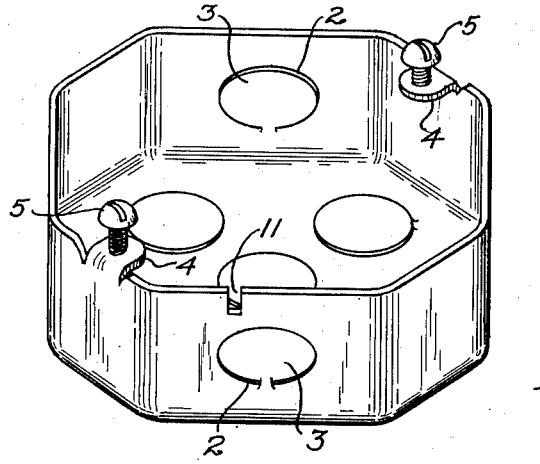

Referring now to the drawings, the numeral 1 refers to an electric outlet box of standard construction, and provided in each side wall and bottom wall with conduit openings 2, temporarily closed by punched plugs 3, which may be easily removed to permit the insertion of conduits. The side wall of the box is formed, at diametrically opposite points, with inwardly extending tabs 4 drilled and tapped to receive screws 5.

A cover plate 6 of standard construction is provided, as a closure member for the open side of outlet box 1. Cover plate 6 is dish-shaped, and is formed with a central circular opening through which extends an outwardly threaded bushing, or fixture stud 7, to which a lighting fixture formed with mating threads is normally fastened. In the flat peripheral portion of cover plate 6, is formed a short radial slot 8, open at one end, and adapted to register with one of the tabs 4 of the box 1 and to receive one of the screws 5. Diametrically opposite slot 8, and in registry with the other tab, is formed an arcuate slot 9 having an enlarged end portion, the enlarged portion being adapted to permit the passage therethrough of the head portion of one of the screws 5, whereas the narrower portion of opening 9 will receive only the shank portion of one of the screws 5.

Referring further to the drawings, a vertical slot 11 is formed in the upper edge of the sidewalls of box 1. At a corresponding position with respect to slot 8 and opening 9 in cover plate 6, a downwardly extending tab 12 is formed, preferably by making a right-angle shaped cut diametrically inward from the outer edge of the cover plate, and bending the partially cut-away portion of the cover plate downward.

In use, the cover plate 6 is secured to outlet box 1 by the screws 5 passing through slot 8 and opening 9 in the cover plate, and tabs 4 of the box. Tab 12 of the cover plate fits into slot 11 of the box to prevent rotation of the cover plate unless screws 5 are considerably loosened. If screws 5 become slightly loosened, due to vibration, or other causes, cooperating tab 12 and slot 11 will prevent registration of the head of screw 5 with the enlarged portion of opening 9, and consequent dropping of the cover plate and fixture. If it is desired to remove the cover plate, screw 5 through opening 9 may be loosened sufficiently for tab 12 to clear the side walls of box 1, the other screw 5 may be slightly loosened, cover plate 6 may be rotated until the screw head registers with the wide portion of opening 9; the cover plate may then be lifted to clear the head of screw 5, and slid from beneath the head of the other screw 5, thereby being completely disconnected from box 1.

Although only one form of the invention has been shown and described in detail, it will be apparent to those skilled in the art that the invention is not so limited but that various changes may be made therein without departing from the spirit of the invention or the scope of the appended claim.

I claim:

In an electric outlet box having a rotatably detachable cover formed with diametrally opposed slots in its face, one of said slots being radial and communicating at its outer end with the periphery of said cover, the other of said slots being arcuate and having one substantially enlarged end portion, said box being formed with screw openings adapted for registry with said radial and arcuate slots, screws in said openings for normally securing said cover to said box, said box being formed with a substantially vertical slot in its upper edge, a downwardly extending projection on said cover formed by pressing a portion of said cover outwardly at substantially a right angle to the plane of said cover, said projection being adapted to register with and to abut against the substantially vertical walls of said vertical slot to prevent undesired rotation and consequent loosening of said cover.

PAUL J. GLOSIER.

REFERENCES CITED

The following references are of record in the file of this patent:

UNITED STATES PATENTS

| Number | Name | Date |
|---|---|---|
| 210,959 | Pearson | Dec. 17, 1878 |
| 854,045 | Paugh | May 21, 1907 |
| 946,646 | Pratt | Jan. 18, 1910 |
| 1,228,731 | Abbott et al. | June 5, 1917 |
| 1,672,683 | Knoderer | June 5, 1928 |
| 1,886,109 | Lenfant | Nov. 1, 1932 |
| 2,018,905 | Urban | Oct. 29, 1935 |
| 2,320,621 | LeFebre | June 1, 1943 |
| 2,321,640 | Adkins | June 15, 1943 |
| 2,470,057 | Spender | May 10, 1949 |

FOREIGN PATENTS

| Number | Country | Date |
|---|---|---|
| 330,676 | Great Britain | June 19, 1930 |